United States Patent [19]

Schumacher

[11] Patent Number: 4,671,024

[45] Date of Patent: Jun. 9, 1987

[54] DISPOSABLE DRIP PAN FOR USE UNDER A VEHICLE

[76] Inventor: Harold W. Schumacher, Rte. 4, Viroqua, Wis. 54665

[21] Appl. No.: 848,938

[22] Filed: Apr. 7, 1986

[51] Int. Cl.$^4$ .................................................. E04B 1/34
[52] U.S. Cl. .......................................... 52/2; 184/106; 52/174
[58] Field of Search ................. 52/2, 174; 220/1 C; 184/106; 296/38

[56] References Cited

U.S. PATENT DOCUMENTS

| | | | |
|---|---|---|---|
| 2,443,440 | 6/1948 | Alvarez | 52/2 X |
| 2,497,565 | 2/1950 | Stark | 184/106 |
| 2,718,014 | 9/1955 | Mizrach | 52/2 X |
| 2,833,375 | 5/1958 | Lundelius | 184/106 |
| 2,938,602 | 5/1960 | Horrocks | 184/106 |
| 2,996,150 | 8/1961 | Cassem | 184/106 |
| 3,661,227 | 5/1972 | Robel et al. | 184/106 |
| 3,722,626 | 3/1973 | Stack | 184/106 |
| 3,834,527 | 9/1974 | Howe | 184/106 X |
| 3,933,002 | 1/1976 | Vickery | 62/235 |
| 4,246,982 | 1/1981 | Pretnick | 184/106 |
| 4,484,661 | 11/1984 | Evenson | 184/106 |

Primary Examiner—Carl D. Friedman
Attorney, Agent, or Firm—Ronald M. Anderson

[57] ABSTRACT

A drip pan adapted to catch dirt and debris falling from a vehicle that is driven onto it, thereby protecting a garage floor surface underlying the drip pan from soiling or contamination. The drip pan is a rectangular sheet of plastic that is sized to extend beyond the perimeter of the vehicle with which it will be used. The edges of the plastic sheet are rolled under and thermally sealed or glued along a line parallel with the perimeter of the sheet, forming a sleeve. In one embodiment, a radially compressible cylindrical material, such as pipe insulation tubing, is inserted into the sleeves to provide a raised ridge around the perimeter of the sheet. In a second embodiment, the sleeves on each side are hermetically sealed and provided with air inflation valves so that they can be inflated to create the ridge. The ridge serves as a side wall to contain the salt, ice, or dirt that falls off the vehicle onto the sheet; a vehicle can be driven over the ridge without damaging it or permanently deforming it. The drip pan is washable and is inexpensive so that it may be discarded and readily replaced when worn.

8 Claims, 5 Drawing Figures

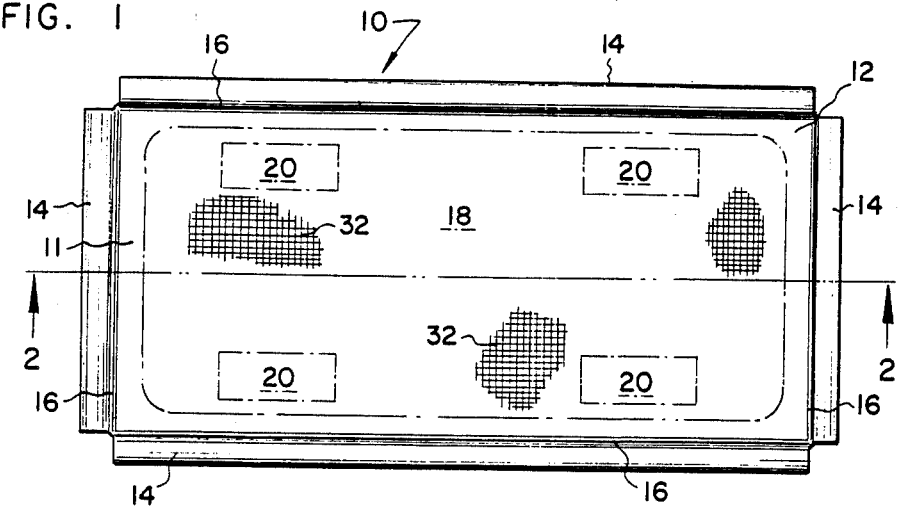
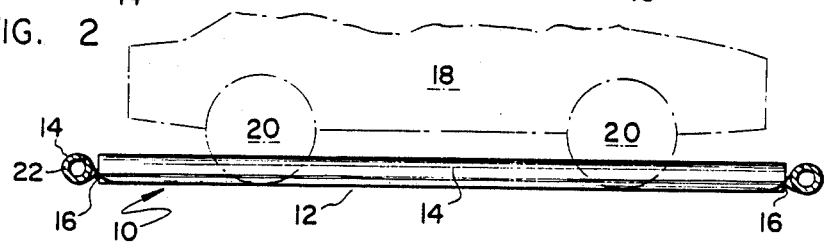
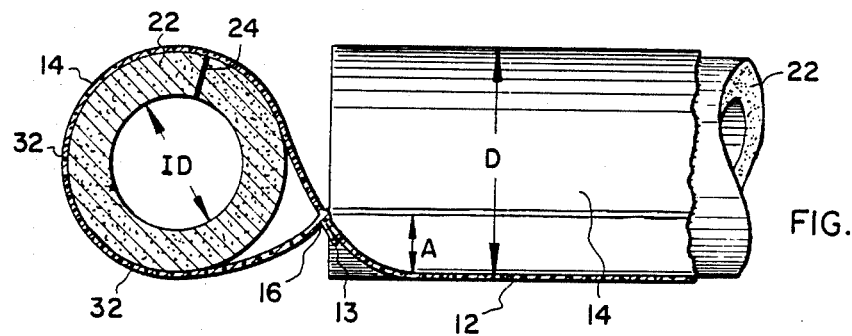
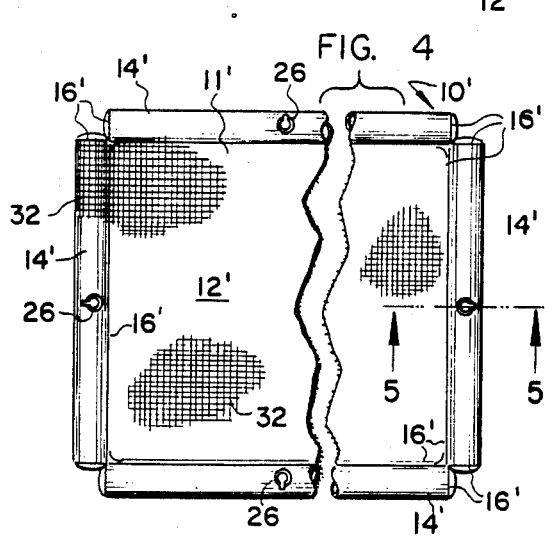
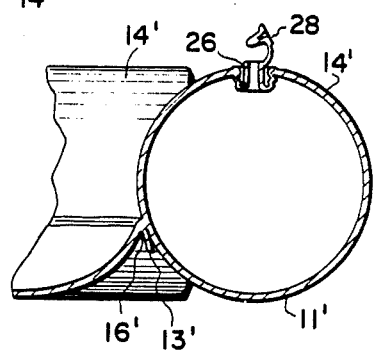

DISPOSABLE DRIP PAN FOR USE UNDER A VEHICLE

BACKGROUND OF THE INVENTION

1. Technical Field

This invention generally pertains to a drip catching device, and specifically to a drip pan for use under a vehicle to catch dirt and other debris that would otherwise contaminate the surface on which the vehicle is parked.

2. Background Art

Vehicles driven over public roads pick-up and accumulate a substantial quantity of dirt and debris on their tires, in their wheel wells, and on their undercarriage, much of which eventually drops off the vehicle onto the surface on which the vehicle is parked. Tis debris may include a relatively high concentration of road salt that is spread on roads during winter to melt ice. Salt is known to have a damaging effect on concrete, causing pitting and weakening of the surface. In any case, the dirt, mud, and melting ice and snow present an unsafe and undesirable appearance on the garage floor. Normally, this problem can only be controlled by frequent sweeping and cleaning of the floor.

Even when a vehicle is not laden with contaminants picked-up from the road, it may drip oil and other lubricants onto the garage surface. Such spots can usually only be removed with solvent, and until this is done, represent a slipping hazard and an unsightly appearance. The conventional shallow metal pan used to catch lubricant spills or drips is relatively small in size, since it is only intended to catch lubricant dripping from a relatively small area of the vehicle's undercarriage. As such, this type drip pan would not be large enough to catch debris falling from all parts of the vehicle chassis. In addition, the sides of such a conventional drip pan would likely be damaged by the vehicle's wheels if it were continually driven onto the drip pan. This would undoubtedly crush the side walls of the pan on one end, allowing contaminants carried with water to flow out onto the garage surface.

It is therefore an object of this invention to provide a relatively low cost drip pan for protecting a surface from debris that falls off any part of the vehicle parked on the surface.

It is a further object of this invention to provide a drip pan with side walls over which a vehicle and drive without damage or permanent deformation of the drip pan perimeter.

A still further object of this invention is to provide a drip pan that is portable and easily cleaned.

Yet a still further object is to provide a drip pan that is sufficiently low in cost that it is readily replaced when damaged or worn.

These and other objects of this invention will become apparent from the attached drawings and the description of the preferred embodiments that follows hereinbelow.

SUMMARY OF THE INVENTION

The present invention is a drip pan on which a wheeled vehicle may be driven and parked. It is adapted to catch dirt and debris that falls from the vehicle, thereby protecting the surface on which the drip pan rests. The drip pan comprises a generally planar, quadrilateral sheet sized slightly larger than the dimensions of the vehicle with which it will be used. The edges of the sheet are rolled toward its center and attached to the sheet along a line inset from and parallel to the perimeter. The rolled portion of the sheet defines a sleeve which is adapted to be filled with a compressible material, thereby forming sides on the drip pan which extend substantially higher in elevation than the planar surface of the sheet. The compressible material permits the wheels of the vehicle to roll over the sides of the drip pan without damaging it or permanently deforming it.

In one embodiment, the sleeves are hermetically sealed and are provided with an air inflation valve so that they may be inflated with air at greater than atmospheric pressure. In another embodiment, an elongate resilient insert comprising a foam cylinder is slid into an open end of the sleeve at each side of the drip pan.

The drip pan is thus relatively light-weight and portable, can be easily moved for washing, and is low in cost making it practical to replace it when it is worn or damaged.

BRIEF DESCRIPTION OF THE DRAWINGS

FIG. 1 is a plan view of the drip pan, showing the relative position of the wheels and perimeter of a vehicle parked upon it during use.

FIG. 2 is a cross-section of the drip pan taken along section lines 2—2 of FIG. 1.

FIG. 3 is an enlarged partially cut-away view of one corner of the drip pan, in elevational aspect.

FIG. 4 is plan view of a second embodiment of the drip pan in which the sleeve are inflated with air.

FIG. 5 is a cross-sectional view of a sleeve forming the side of the second wmbodiment of the drip pan, taken along section line 5—5 of FIG. 4.

DESCRIPTION OF THE PREFERRED EMBODIMENTS

Referring to FIGS. 1-3, a first embodiment of the drip pan is generally denoted by reference numeral 10. The drip pan comprises a rectangular sheet of plastic 11, having a bottom 12, and four edges 13 each of which are rolled under and thermally bonded to sheet 11 to form four perimeter sleeves 14. Approximately four and one-half inches (4½") of sheet 11 are folded under and bonded along a line 16, parallel to edge 13, to form these sleeves. At least two diagonally opposite corners are cut out after the sleeves are thus formed, so that each of the four sleeves 14 has at least one open end.

Sheet 11 is initially sized so that once edges 13 have been rolled under and bonded along line 16, the dimensions of drip pan 10 exceed the "drip line" dimensions of a vehicle 18 which is to be parked upon the pan. FIGS. 1 and 2 use dot-dash lines to indicate the nominal position of a vehicle 18 and of its tires 20 when the vehicle is parked on drip pan 10 as it would be during use. It will be evident that any dirt or debris falling down from vehicle 18 will be collected on the bottom 12 of drip pan 10, and will not contaminate any underlying surface.

As shown in FIGS. 2 and 3, sleeves 14 are each filled and expanded radially outward by inserted cylindrical foam tubes 22. In the first preferred embodiment, tubes 22 comprise a high density plastic foam tubing of the type normally used to insulate water pipes. Tubes 22 are available either with or without a slot 24 running the length thereof, are equally useful for this purpose. If tubes 22 designed for use on three-quarter inch (¾") pipe are used, i.e. with an I.D. of that dimension, sleeves 14 are substantially filled and expanded so that a side wall having an elevational height aproximately equal to the diameter "D" of tubes 22 is formed around the perimeter of drip pan 10. If care is exercised in cutting out the corners of sleeves 14 to open at least one end of each sleeve, the effective depth of the drip pan should be equal to "D", i.e. about two inches (2"). The minimum effective depth (at the corners) should in no case be less in elevation above bottom 12 than dimension "A", i.e. about one-half inch (½"). This is more than adequate to hold a substantial quantity of dirt, or melting snow, even on an underlying surface that is slightly unlevel.

It will be apparent that a larger sleeve 14 could be formed on drip pan 10, and a larger diameter insert tube 22 used if desired. The dimensions given above are merely indicative of those used in the preferred embodiment, and should in no way be considered a limitation on the scope of the invention as claimed hereinbelow.

Turning now to FIGS. 4 and 5, a second embodiment of the drip pan is shown by reference to numeral 10', the prime notation being used with reference numberals of each of the elements that are similar in form and function to those in the first embodiment. On drip pan 10', the four corners formed by folding under edges 13' of sheet 11' are not cut open as in the first embodiment, but instead are left hermetically sealed on each end. The excess material may be trimmed-off as ahown in FIG. 4, but this is not necessary.

The other significant difference between the two embodiments is that the second embodiment does not include foam insert tubes 22. Instead, an air inflation valve 26 is provided in each sleeve 14', through which air may be introduced at higher than atmospheric pressure to inflate the sleeves. Air inflation valves 26 are glued, thermally bonded, or otherwise suitably attached to sheet 11' on the top of sleeves 14' in fluid communication with the interior thereof, and include a stem 28 and stopper 30. Stem 28 may be pulled out of the well-like junction at the base of valve 26, for manual inflation. After each sleeve 14' is sufficiently inflated, stopper 30 is forced into stem 26 to seal the valve. Valves 26 are similar to those used on inflatable plastic toys. In the second embodiment, air under pressure thus comprises the compressible material with which sleeves 14' are filled, rather than a foam insert, as in the first embodiment. The two embodiments are otherwise substantially simialr.

Both embodiments of drip pan 10 and 10' may be made of relatively inexpensive polyethylene plastic sheet 11, which will last for several months of use before being discarded. In the first embodiment, the foam inserts comprise the highest cost element; however, these may be removed from a drip pan 10 which is worn or damaged and be reused by insertion into sleeves 14 of a new drip pan 10. The resulting replacement drip pan would thus clearly be lower in cost. As an alternative, either drip pan 10 or 10' may be made of more durable polyethylene plastic, e.g. a sheet 11 or 11' comprising two layers (each 3 mils thick) bonded together on each side of a one-half inch (½") square grid of nylon fibers 32. Such nylon reinforced plastic sheeting is readily available from numerous commercial sources. A drip pan manufactured from this heavier, tear resistant plastic can be washed and reused for a relatively long period of time. It is also anticipated that the drip pans 10/10' could by provided in several sizes to accommodate vehicles of different length and width.

Although the preferred embodiment will likely use a thermal bonding technique to form sleeves 14 or 14', it is also possible that a suitable adhesive could be used to adhere the rolled-under edge 13/13' of plastic sheet 11/11' to itself. Alternative inserts, for example solid foam, or non-cylindrical inserts could be used instead of tubes 22. These and other modifications to the preferred embodiments of drip pan 10/10' disclosed above will be apparent to those skilled in the art within the scope of the invention as claimed hereinbelow.

I claim:

1. A drip pan on which a wheeled vehicle may be driven and parked, said drip pan being adapted to catch dirt and debris that falls from the vehicle, thereby protecting a surface on which the drip pan rests, comprising: a generally planar quadrilateral sheet defining a bottom of the drip pan, the edges of said sheet being rolled over and hermetically sealed to the sheet along a line parallel to the edge to define a separately formed sleeve along each edge of the sheet that is sealed at each end, said sleeve being adapted to be filled with a compressible material, thereby forming sides that extend substantially higher in elevation than the planar surface, said compressible material permitting the wheels of the vehicle to roll over the side of the drip pan without damaging it or permanently deforming it.

2. The drip pan of claim 1 further comprising an air inflation valve disposed in the sleeve, wherein the compressible material comprises air under greater than atmospheric pressure, which is introduced into the sleeve through the air inflation valve to inflate the sleeve.

3. A drip pan on which a wheeled vehicle may be driven and parked, said drip pan being adapted to catch dirt and debris that falls from the vehicle, thereby protecting a surface on which the drip pan rests, comprising: a generally planar quadrilateral sheet defining a bottom of the drip pan, the edges of said sheet being rolled over and attached to the sheet along a line parallel to the edge, defining a sleeve which is adapted to be filled with a compressible material, one end of each sleeve being opened so that the compressible material may be removed or inserted, said sleeves when filled with compressible material forming sides that extend substantially higher in elevation than the planar surface, said compressible material permitting the wheels of the vehicle to roll over the side of the drip pan without damaging it or permanently deforming it.

4. A drip pan for use in covering and protecting a generally planar surface from dirt, water, and lubricants that fall from a wheeled vehicle which is driven over and parked thereon, said drip pan comprising: a rectangular sheet of relatively thin flexible material, said sheet being sized so that its length and width substantially exceed the length and width of the vehicle; a peripheral sleeve around the perimeter of the sheet formed separately along each edge of the sheet by folding over each edge and hermetically sealing the edge to the sheet along a line inset from the perimeter, said hermetic seal running the length of the edge and across each end of the sleeves; and means for radially expanding the sleeve cross-section, thereby defining sides which are substantially higher in elevation than the planar surface on which the sheet rests, said means being compressible to permit the wheels of the vehicle to roll over the sides without damaging or permanently deforming the drip pan.

5. The drip pan of claim 4 wherein the means for expanding the sleeve comprise and air inflation valve through which air under greater than atmospheric pressure is introduced into the sleeve to inflate it into a cylindrical shape.

6. A drip pan for use in covering and protecting a generally planar suface from dirt, water, and lubricants that fall from a wheeled vehicle which is driven over and parked thereon, said drip pan comprising: a rectangular sheet of relatively thin flexible material, said sheet being sized so that its length and width substantially exceed the length and width of the vehicle; a peripheral sleeve around the perimeter of the sheet formed by folding over each edge and attaching the edge to the sheet along a line inset from the perimeter, wherein at least one end of the sleeve along each edge of the sheet is opened; and means for radially expanding the sleeve cross-section, said means for radially expanding the sleeve being removed or inserted through each of said open ends of the sleeves; said sleeves when radially expanded defining sides which are substantially higher in elevation than the planar surface on which the sheet rests, said means being compressible to permit the wheels of the vehicle to roll over the sides without damaging or permanently deforming the drip pan.

7. A method for making a drip pan for use in protecting a generally planar surface from dirt and debris that falls from a wheeled vehicle driven over and parked thereon, said method comprising the steps of:
   a. rolling over the edges of a rectangular thin flexible sheet and attaching the edges to the sheet along a line that is inset from the perimeter of the sheet to form a sleeve that is hermetically sealed along its length;
   b. installing a valve in the sleeve; and
   c. filling the sleeve with a compressible material introduced through the valve, thereby defining sides that are substantially higher in elevation than the planar surface and over which the wheels of the vehicle may roll without damaging the drip pan or permanently deforming it.

8. The method of claim 7 wherein the compressible material is air under higher than atmospheric pressure.

* * * * *